United States Patent [19]
Ryan

[11] Patent Number: 4,743,984
[45] Date of Patent: May 10, 1988

[54] SCHEME FOR ENCODING A MAGNETIC TAPE CASSETTE

[75] Inventor: Dennis M. Ryan, Redwood City, Calif.

[73] Assignee: Ampex Corporation, Redwood City, Calif.

[21] Appl. No.: 779,907

[22] Filed: Sep. 25, 1985

[51] Int. Cl.⁴ .................... G11B 15/04; G11B 23/02
[52] U.S. Cl. ........................................ 360/60; 360/132
[58] Field of Search ...................... 360/60, 132, 137

[56] References Cited

U.S. PATENT DOCUMENTS

| | | | |
|---|---|---|---|
| 4,320,421 | 3/1982 | Larson et al. | 360/60 |
| 4,564,878 | 1/1986 | Weavers et al. | 360/60 |

OTHER PUBLICATIONS

Literature on Sony Product BVU-150P, Jun. 1985.

Primary Examiner—Vincent P. Canney
Attorney, Agent, or Firm—Harry G. Thibault; Richard P. Lange; Joel D. Talcott

[57] ABSTRACT

A coding array usable on a series of cassettes of varying size, the array symmetrically located in a threading area of the cassette with respect to designated cassette reference points, to present the array of each size cassette to the associated recorder at the same relative position, each array incorporating a record inhibit device for the cassette.

7 Claims, 4 Drawing Sheets

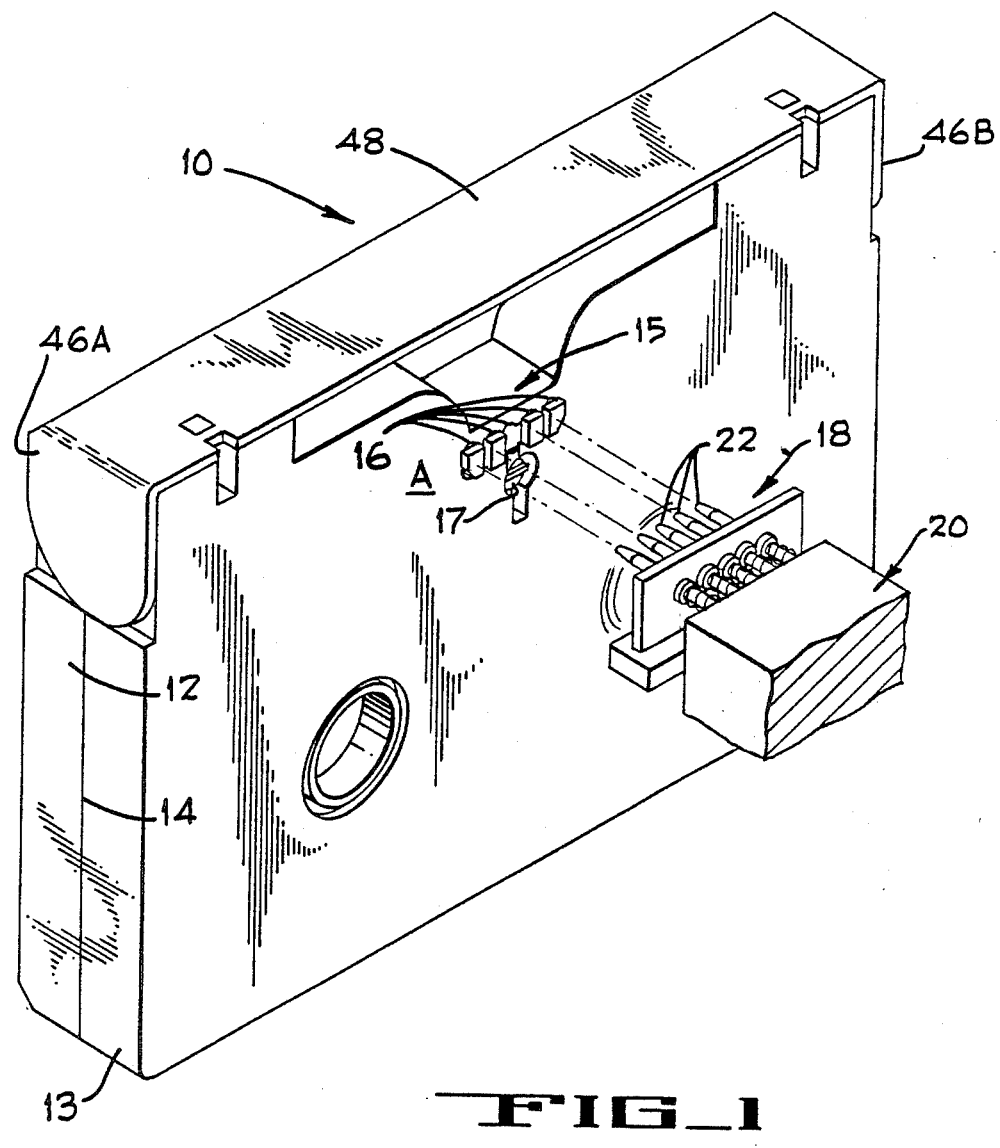
FIG_1

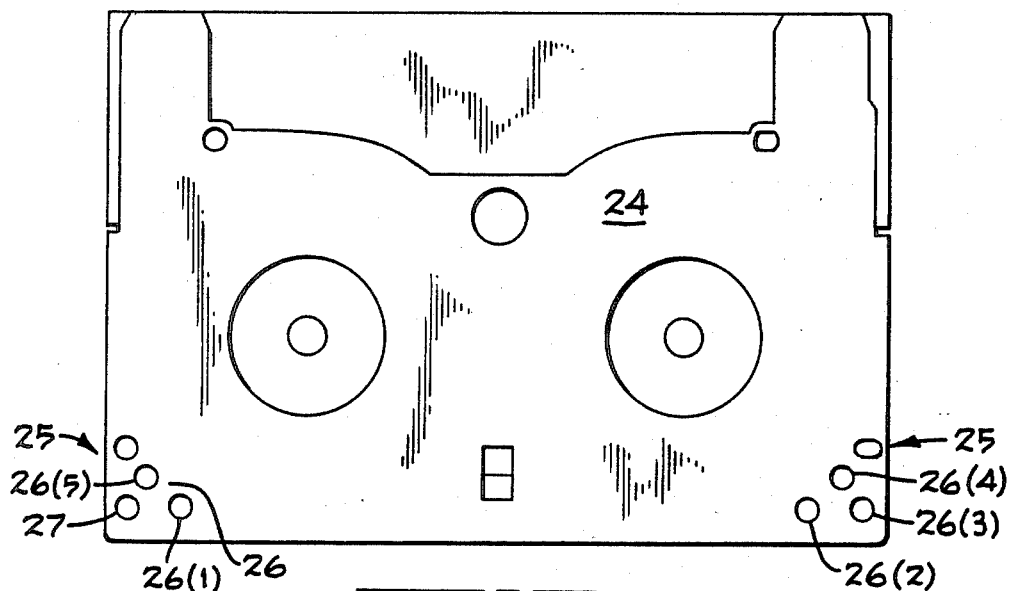
FIG_2 (PRIOR ART)
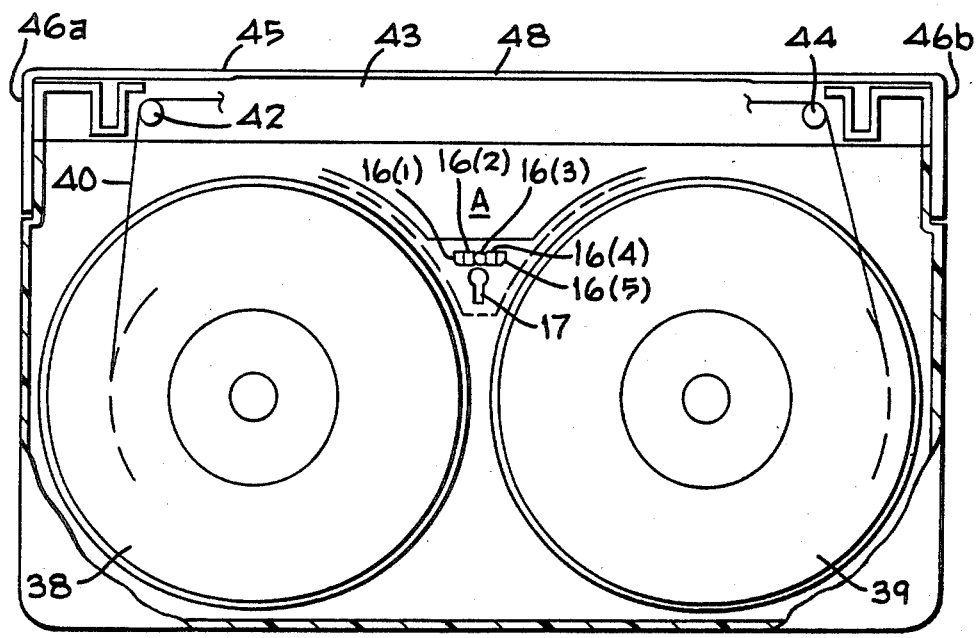
FIG_3

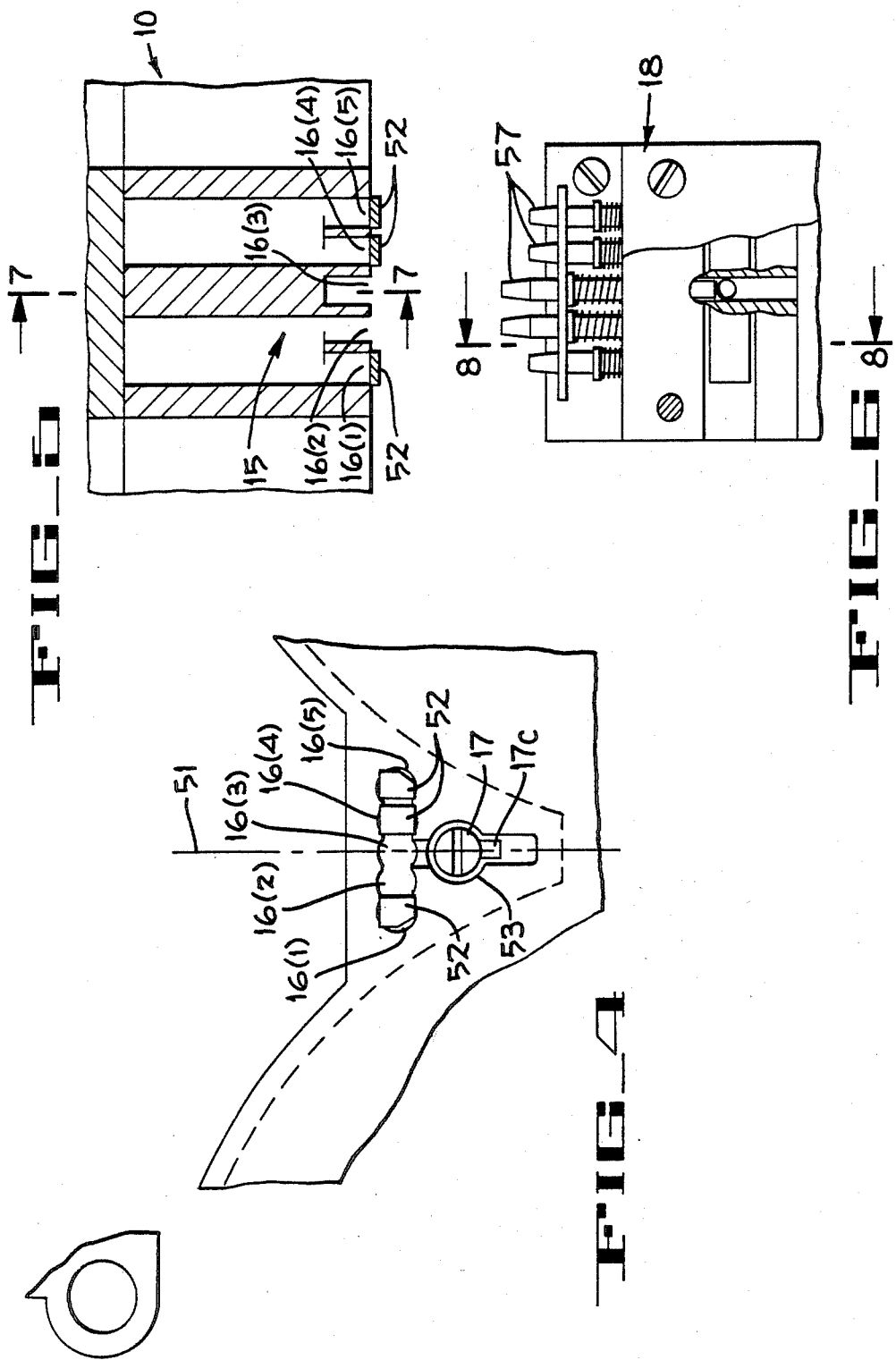

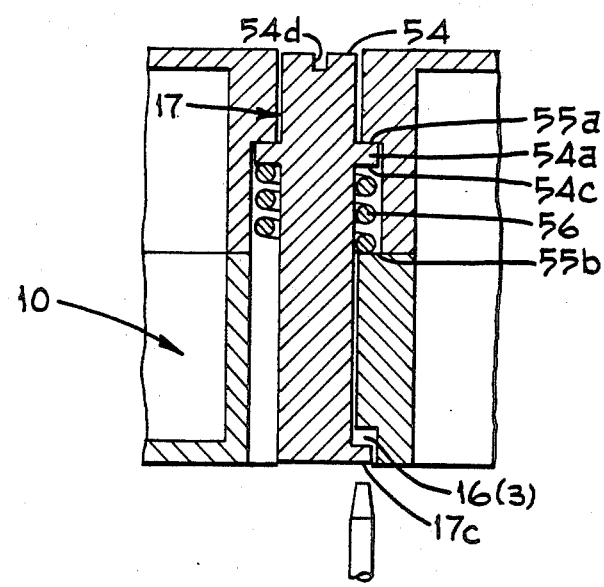
FIG_7
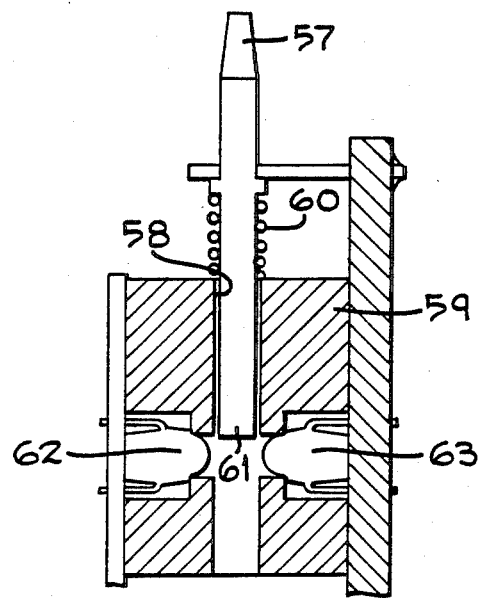
FIG_8

SCHEME FOR ENCODING A MAGNETIC TAPE CASSETTE

BACKGROUND OF THE INVENTION

(1) Field of the Invention

This invention relates to a magnetic tape cassette for use in a magnetic record/reproduce apparatus such as a magnetic tape recorder, and in particular to a coding array for the cassette, such coding array comprising a series of coding holes which are sensed by the apparatus in which the cassette is loaded.

(2) Description of the Prior Art

In the evolution of the magnetic tape cassette/recorder interface, the choices in the early days were far simpler than they are today. For example, early magnetic tape recorders used only one size cassette, and, in that cassette, the tape thickness did not vary and the tape type did not vary. Accordingly, there was no need to provide a scheme allowing for the variation of these parameters. The only parameter of consideration in the early cassettes was associated with a record inhibit device generally provided on an edge of the cassette as a lockout tab which was removed to prevent accidental recording on the cassette.

Coding holes first were used in an 8 millimeter cassette developed for the video tape industry. Because tape type and tape thickness could be changed for the 8 millimeter cassette, it was decided to designate two coding holes provided on one side of the cassette for sensing tape type and tape thickness. The coding holes were provided at the edges of the cassette. Such a coding scheme was clearly devised without consideration for variations in cassette size, since, if the cassette were down-sized, the coding holes would have to be moved. And, if the cassette were enlarged, the larger tape reels of the larger cassette would again force the coding holes to be moved.

SUMMARY OF THE INVENTION

Thus it would be desirable to devise a coding array which can readily incorporate the record inhibit device as an element of that array for use in a series of cassettes of varying sizes.

In such an array, symmetry, commonality of location, compactness of design, accessibility and close spatial relationship between the record inhibit device and the coding array become critical design elements. The record inhibit device can be readily incorporated into the coding array since it is also supplying tape information to the recorder.

Accordingly, it would be highly desirable and extremely effective to develop a coding array including a record inhibit device for placement on a cassette in a location which does not change when the size of cassette changes. A single coding array used in a series of cassettes of varying size, which can be located with respect to reference points common to each cassette of the series, which can incorporate the record inhibit device as part of the coding array, which can substantially reduce design effort for the cassette, and which can simplify the mechanical interface between the cassette and its associated recorder, advances the technology associated with that interface.

It is also desirable that the record inhibit device included in such coding array be responsive to the same sensing mechanism provided on the recorder for use with the coding array.

Accordingly the present invention provides a coding array wherein the record inhibit device is aligned with the coding holes of the coding array. More particularly the coding array comprises a compact, symmetric alignment of discrete senders or coding holes located with respect to specific reference points on the cassette, with the record inhibit device included in the array. A sensing mechanism comprising a series of axially aligned sensors complementary to the coding array on the cassette is provided on an associated record/reproduce apparatus such as a videotape recorder.

The coding array works as follows. In the manufacture of the cassette a "knock-out" tab is placed over each of the coding holes. To encode the cassette, the tabs are selectively removed from the holes to define a specific code for the cassette. If a coding hole is not covered, the associated sensor, which is biased to an extended position, enters the hole and no signal is activated. If a coding hole is covered, the sensor engages the knock-out tab and is moved against its bias to depress the sensor and activate a signal which transmits cassette information to the recorder. Of course, the sensing mechanism could be programmed to generate a signal if the coding hole is not covered.

The series of signals generated by the sensing mechanism may represent, for example, a binary number which can be equated to tape information for the recorder. Thus the proposed coding array offers a simple, compact, and versatile coding mechanism which can be used for a series of cassettes of varying sizes.

A better understanding of the present invention can be obtained by considering the detailed description of the invention as set forth below.

BRIEF DESCRIPTION OF THE DRAWINGS

The accompanying drawings illustrate the preferred embodiment of the present invention applied to a magnetic tape cassette for a video tape recorder in which:

FIG. 1 is a perspective view of a magnetic tape cassette and a portion of the video tape recorder to be used therewith; the cassette and the recorder are rotated 90° to more clearly show the interface there- between;

FIG. 2 is a bottom plan view of an 8 millimeter cassette showing a prior art coding hole array provided at the edges of the cassette;

FIG. 3 is a bottom plan view of the tape cassette of FIG. 1 with portions thereof broken away for clarity;

FIG. 4 is a detail view of the coding array for the cassette of FIG. 3;

FIG. 5 is a detail of the portion of the cassette incorporating the coding mechanism;

FIG. 6 is a detail of the signal sensing mechanism of the recorder;

FIG. 7 is a sectional view taken along the line 7—7 of FIG. 5; and

FIG. 8 is a sectional view taken along the line 8—8 of FIG. 6.

DESCRIPTION OF THE PREFERRED EMBODIMENT

Referring first to FIG. 1 there is shown a magnetic tape cassette 10 which has a flat rectangular parallelepiped shape and is constructed of an upper half section 12 and lower half section 13, both molded from a suitable synthetic resin such as polycarbonate, and secured together by screws or other fastening means.

A coding array 15, provided on the bottom of the cassette 10, comprises a symmetric alignment of coding holes 16 disposed below a threading area A. A record inhibit device 17, located just below the coding array 15 in FIG. 1, is associated therewith as described below.

Generally aligned with the coding array 15 is a sensing mechanism 18 provided on a record/reproduce apparatus, such as a videotape recorder 20. Sensing probes 22 of the sensing mechanism 18 engage the coding array 15 of the cassette 10 to transmit cassette information to the videotape recorder 20.

It is believed that an examination of a known cassette coding scheme will give the reader a better appreciation of the present invention. In the interest of clarity and simplicity, it is deemed not necessary to show the cassette and sensing mechanism/recorder interface for the cassette 24 of FIG. 2. In considering the coding array of FIG. 2, reference may be had to the cassette and sensing mechanism/recorder interface shown in FIG. 1 to supplement the discussion set forth below. An 8 mm video cassette 24, shown in FIG. 2, first offered users a choice of tape types and a choice of tape thicknesses. To supply a recorder using the cassette 24 the necessary information as to tape type and tape thickness, a coding array 25 was provided on opposite sides of the cassette 24 for interaction with an associated recorder.

In that coding array 25, as shown in FIG. 2, the 8 mm video cassette 24 was provided with a series of recognition holes 26. Within the array 25 of recognition holes 26, a first recognition hole 26(1) provided information as to tape type. A closed hole would signify type A, and an open hole would signify type B. The recognition hole 26(2) was used for distinguishing tape thickness. For a tape thickness of 13 microns, hole 26(2) was closed and for a tape thickness of 10 microns, hole 26(2) was open. Additional recognition holes 26(3), 26(4) and 26(5) are provided on the cassette 24, for additional, as yet undesignated, parameters.

The 8 mm video cassette coding scheme also includes a mis-erasure protection hole 27 provided at the lower left hand side of the cassette 24. The device 27 is analogous to the record inhibit device 17 of the present invention. Although the proposed coding array 25 for the 8 mm video cassette 24 would indeed supply coding information from the cassette 24 to its associated recorder, it is clear that such scheme was not designed to account for changes in size for the cassette 24 on which use of the scheme was contemplated.

For example, if the cassette 24 were down-sized, because the coding holes 26 are at the edges of the cassette 24, the coding holes 26 would be lost. A new set of coding holes 26 on the smaller cassette would have to be aligned with the associated sensing device provided in the recorder. Thus down-sizing of the cassette 24 would either require the sensing device in the recorder to move to accommodate the new coding array 25 or require a second set of sensors in the recorder to sense the new coding array 25. If the 8 mm video cassette 24 were enlarged, the larger tape reels (not shown) would again displace the coding holes 26, requiring the movement of the first set of sensors in the recorder or a second set of sensors to accommodate the new position of the coding holes 26. Neither of these solutions is practical and it is obvious that the designer of the 8 mm video cassette 24 did not even consider the problem solved by the coding array 15 of the present invention.

The present invention offers a unique solution to the problems existent in known coding arrays. Before a discussion of the coding array 15 of the present invention it is necessary to provide additional background for an understanding of the cassette environment in which such invention operates. As shown in FIGS. 1 and 3, the tape cassette 10 includes a supply reel 38 and a take-up reel 39 rotatably mounted therein for winding a magnetic tape 40 thereon. The path of the magnetic tape 40 is from the supply reel 38, around a first tape guide 42, across a tape access opening 43 adjacent the threading area A provided in the cassette 10, around a second tape guide 44 and onto the take-up reel 39. A door 45 which is also molded of a synthetic resin and which includes a pair of ears 46a and 46b directed rearwardly from a front portion 48 of the door 45 closes the tape access opening 43 in the case 10. The ears 46a and 46b are rotatably mounted at the side of the casing 10, and rotatably supported thereby.

The coding holes 16 are hereinafter designated individually as coding holes 16(1),(2),(3),(4),(5). The record inhibit device 17 is included as part of the coding array 15 as described in detail below. As shown in FIGS. 4–7, coding holes 16(1),(2),(4),(5) are symmetrically aligned about a center axis 51 of the cassette 10. Break-off tabs 52 cover the coding holes 16(1),(4),(5). A key-hole shaped opening 53 receives the record inhibit device 17 which intrudes into the coding array 15 as shown in FIG. 4 wherein the device 17 can be rotated to align a tang 17c with the coding hole 16(3).

FIGS. 4 and 5 show a specific coding array 15 for the cassette 10. Coding holes 16(1),(4),(5) are covered by knock-out tabs 52 and hole 16(2) is not covered. The middle hole, 16(3), is associated with the record inhibit device 17. In FIG. 7, a section 7—7 taken through the cassette 10 at the hole 16(3) shows that the record inhibit device 17 comprises a rotator member 54 having an annular flange 54a which is trapped against an annular upper shelf 55a of the cassette 10 by a compression spring 56. The spring 56 is trapped between a lower face 54c of the flange 54a and a lower annular shelf 55b. Engagement of a key slot 54d at the top of rotator member 54 with a screwdriver or similar tool (not shown) lowers the rotator member 54 against the bias of spring 56 and rotates tang 17c provided at the bottom of rotator member 54 into alignment with hole 16(3) to close the hole 16(3). The record inhibit device 50 is used to prevent the recorder 20 from erasing prerecorded information on the cassette 10.

In FIG. 6, the signal sensing mechanism 18 for the recorder 20 is shown. Signal sensing mechanism 18 comprises a series of sensors or probes 57 which are in complementary alignment with respective coding holes 16 of the coding array 15 of the cassette 10.

The sensing mechanism 18 can be seen in greater detail in FIG. 8 wherein one of the probes 57 is received in an opening 58 in sensor body 59. A spring 60 biases the probe 57 to an upwardly extending position. Provided at a lower end 61 of the probe 57 is a light emitting diode 62 and a photo transistor 63 to transmit a light beam therebetween. When the probe 56 engages an obstruction it moves against the bias of the spring 60 to place the lower end 61 of the probe 57 between the light emitting diode 62 and the photo transistor 63 to interrupt the light beam therebetween.

Coding holes 16(1),(2),(4),(5) may be used in a binary coding array for indicating tape thickness and tape type. For example, the coding array 15 can be used to indicate a zero (0) signal if a hole 16 is covered by a knock-out tab 52 to cause a probe 57 to interrupt the signal between diode 62 and photo transistor 63 and a positive signal when hole 16 is not covered and no such interruption of signal occurs. Using the numeral zero (0) for no signal and the numeral one (1) for a positive signal, the coding array 15 can be used to generate a four digit binary number from coding holes 16(1),(2),(4),(5), which can represent as many as 16 combinations of tape thickness and tape type defined by the coding array. For example, the coding array of FIGS. 4 and 5 represents the binary number 0100. Alternatively coding holes 16(1), (2) can be used to generate a two-digit binary number representing tape type and coding holes 16(4), (5) can be used to generate a second two-digit binary number representing tape thickness to again generate a coding array of 16 combinations of tape type and tape thick- ness.

In the designated array 15, access to the hole 16(3) by the probe 57 provides an inhibit signal to the recorder 20 to prevent the user from erasing information already on the tape; if the record inhibit device 17 is rotated to position the tang 17c in the hole 16(3) the probe 57 has no access to hole 16(3), and the recorder 20 receives a signal that recording is possible on the cassette 10.

If the array 15 were symmetrically aligned with respect to cassette centerline 51, that single array 15 could be used with each cassette in a series of small (S), medium (M), and large (L) cassettes. Location of the array 15 with respect to specific cassette reference points, such as the cassette centerline 51, would cause the array 15 for each size cassette to overlay the array for all of the other cassettes in the series, to obviate the need for different arrays for different sized cassettes. And, the inclusion of the record inhibit device 17 in the array 15 aligns all of the record inhibit devices 17 of the series to further simplify the cassette/recorder interface.

Having described a preferred embodiment of the invention, it is understood that the invention is not limited to the above description and various changes and modifications may be made therein without affecting the intent and scope thereof, such scope to be defined by the appended claims. For example, the probes could be used to activate mechanical switches provided in the coding holes which is a workable alternative to the preferred embodiment.

What is claimed is:

1. In a series of magnetic tape cassettes of varying sizes, each size cassette receivable in a single record/reproduce apparatus for play, a coding mechanism comprising:
    a single symmetric array of discrete sending means disposed on each size cassette of the series with respect to reference points common to each cassette for transmitting cassette information to the apparatus;
    said alignment including a record inhibit device; and
    means for activating selected ones of the sending means, to designate a specific code for a selected cassette, the array of said sending means aligned with and accessible to a complementary array of sensors provided on a signal sensing mechanism associated with the apparatus, said sensor array including a sensor responsive to cassette information generated by the record inhibit device, said array of sensors to transmit the designated code to the apparatus.

2. A coding mechanism for a magnetic tape cassette as claimed in claim 1 wherein each of the sensors provides either a zero output or a positive output to the apparatus, the series of outputs designating a binary number which represents tape information for the apparatus in an encoded form.

3. A coding mechanism as claimed in claim 1 wherein the sending means comprises an array of discrete openings provided in each size of the series and individually covered during the manufacture of the cassette, and each array of openings in each size cassette may be selectively uncovered to designate a specific code for the cassette.

4. A coding mechanism for a magnetic tape cassette as claimed in claim 1 wherein each sensor comprises a probe having a sensing member biased to first position for engagement with the complementary sending means provided in the cassette, biasing means retaining the probe in the first position, and signal generating means provided within the apparatus and having a signal path which is not interrupted by the probe when it is biased to the first position and is interrupted by the probe when the probe moves aganist the biasing means, to indicate that a sending means in the cassette is operative.

5. A coding mechanism for a magnetic tape cassette as claimed in claim 1 wherein the record inhibit device comprises a rotatable member having a portion thereon which inactivates one of the sending means in the coding array to prevent cooperative interaction with a complementary sensor on the apparatus in one position and rotates to a second position wherein such cooperative interaction is permitted.

6. In a series of magnetic cassettes of varying size, each size cassette receivable in a single record/reproduce apparatus for play, a method of encoding each size cassette of the series, said method comprising:
    disposing the same alignment of sending means symmetrically on each size cassette of the series with respect to reference points common to each cassette for transmitting cassette information to the apparatus;
    including a record inhibit device in such alignment;
    selectively activating the sending means in a specific pattern which designates a specific code for a selected cassette; and
    engaging the selected pattern with complementary sensors provided on a signal sensing mechanism of the apparatus to transmit the designated code to the apparatus.

7. In a series of magnetic tape cassettes of varying sizes, each size cassette recivable in a single record/reproduce apparatus for play, a coding array comprising:
    a single symmetric alignment of discrete openings disposed on each size cassette of the series with respect to reference points common to each cassette for transmitting information to the apparatus;
    said alignment including a record inhibit device;
    means covering the openings; and
    means for designating a specific code for a selected cassette by uncovering selected openings, the alignment of openings aligned with and accessible to a complementary array of sensing probes provided on a signal sensing mechanism associated with the apparatus, the sensing array including a probe complementary to the record inhibit device on each cassette and responsive to cassette information generated thereby, said array of probes to transmit the designated code to the apparatus.

* * * * *